United States Patent
Kang et al.

(10) Patent No.: US 12,145,522 B2
(45) Date of Patent: Nov. 19, 2024

(54) PEDESTRIAN DETECTION SYSTEM

(71) Applicants: Hyundai Motor Company, Seoul (KR); Kia Corporation, Seoul (KR)

(72) Inventors: Seung Kyu Kang, Hwaseong-si (KR); Jong Hun Choi, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/354,250

(22) Filed: Jul. 18, 2023

(65) Prior Publication Data

US 2024/0278742 A1    Aug. 22, 2024

(30) Foreign Application Priority Data

Feb. 22, 2023    (KR) .................. 10-2023-0023735

(51) Int. Cl.
  *B60R 21/0136*    (2006.01)
  *B60R 21/00*    (2006.01)
  *B60R 21/34*    (2011.01)

(52) U.S. Cl.
  CPC .......... *B60R 21/0136* (2013.01); *B60R 21/34* (2013.01); *B60R 2021/0027* (2013.01)

(58) Field of Classification Search
  CPC .............. B60R 21/0136; B60R 21/34; B60R 2021/0027
  See application file for complete search history.

(56) References Cited

U.S. PATENT DOCUMENTS

| 10,737,658 B2 | 8/2020 | Foo et al. | |
| 2006/0185923 A1 | 8/2006 | Tanabe | |
| 2007/0162231 A1 | 7/2007 | Schlogl | |
| 2008/0068008 A1 * | 3/2008 | Watson | G01R 33/0283 324/228 |
| 2009/0050394 A1 * | 2/2009 | Takahashi | B60R 21/0134 180/274 |
| 2014/0207341 A1 * | 7/2014 | Wanami | B60R 21/0136 701/46 |

FOREIGN PATENT DOCUMENTS

| AU | 2004266939 A1 * | 2/2006 | ............ B32B 17/10 |
| CN | 110641406 A * | 1/2020 | |
| CN | 114566031 A * | 5/2022 | ......... B60R 21/0136 |
| CN | 113306550 B * | 3/2023 | .......... B60W 30/085 |
| DE | 10002110 A1 * | 7/2001 | ............ B60R 21/34 |
| DE | 102004027862 A1 * | 6/2006 | ......... B60R 21/0136 |
| DE | 102015219519 A1 * | 4/2017 | |

(Continued)

OTHER PUBLICATIONS

V. Frey, DE 10 2010 029017, Machine English Translation, ip.com (Year: 2010).*

(Continued)

*Primary Examiner* — Karen Beck
(74) *Attorney, Agent, or Firm* — Slater Matsil, LLP (57) ABSTRACT

An embodiment pedestrian detection system includes a detection device mounted on a front portion of a vehicle and configured to detect a collision with a pedestrian and an emergency call device configured to convert an electric signal received from the detection device into a detection value and determine an injury pattern based on the detection value.

20 Claims, 9 Drawing Sheets

(56) References Cited

FOREIGN PATENT DOCUMENTS

| | | | |
|---|---|---|---|
| DE | 102010029017 B4 * | 6/2020 | ......... B60R 21/0136 |
| DE | 102020126273 A1 * | 4/2022 | |
| EP | 1731377 A1 * | 12/2006 | ......... B60R 21/0132 |
| JP | 4496476 B2 | 7/2010 | |
| JP | 2012111339 A | 6/2012 | |
| JP | WO2020145201 A1 * | 2/2021 | |
| KR | 20060086262 A | 7/2006 | |
| KR | 101536872 B1 | 7/2015 | |
| KR | 101810539 B1 | 12/2017 | |
| WO | WO-2004089699 A1 * | 10/2004 | ......... B60R 21/0136 |

OTHER PUBLICATIONS

Wang et al. CN 113306550B machine English translation, ip.com (Year: 2023).*

Qiu et al. CN 114566031 Machine English translation, ip.com (Year: 2022).*

* cited by examiner

PEDESTRIAN DETECTION SYSTEM

CROSS-REFERENCE TO RELATED APPLICATIONS

This application claims the benefit of Korean Patent Application No. 10-2023-0023735, filed on Feb. 22, 2023, which application is hereby incorporated herein by reference.

TECHNICAL FIELD

The present disclosure relates to a pedestrian detection system.

BACKGROUND

As vehicle autonomous driving technologies become popularized and unmanned vehicles become available, it may be difficult to quickly and accurately detect pedestrian injuries in the event of a pedestrian collision and appropriately deal with them.

For example, a pedestrian detection system for a vehicle according to the related art operates in the event of a pedestrian collision as follows: generating, by an airbag control unit, a collision signal; operating an emergency call system; transmitting location information of the vehicle to emergency rescue centers, medical institutions, and the like; and making an emergency call for an ambulance and the like.

As another example, a pedestrian detection system for a vehicle according to the related art operates in the event of a pedestrian collision as follows: pressing, by a driver or an occupant, an SOS button; operating an emergency call system; transmitting location information of the vehicle to emergency rescue centers, medical institutions, and the like; and making an emergency call for an ambulance and the like.

However, when an unmanned vehicle collides with a pedestrian, it may be difficult to accurately detect the degree of pedestrian injuries and quickly send an emergency call resulting from the pedestrian collision to emergency rescue centers, medical institutions, and the like, so prompt actions may not be taken for the victim.

The above information described in this background section is provided to assist in understanding the background of the inventive concept and may include any technical concept which is not considered as the prior art that is already known to those skilled in the art.

SUMMARY

The present disclosure relates to a pedestrian detection system. Particular embodiments relate to a pedestrian detection system designed to accurately detect pedestrian injuries when a pedestrian collides with a vehicle and send an emergency call including the detection results (injury pattern) to medical institutions and the like.

Embodiments of the present disclosure can solve problems occurring in the prior art while advantages achieved by the prior art are maintained intact.

An embodiment of the present disclosure provides a pedestrian detection system designed to accurately detect pedestrian injuries when a pedestrian collides with a vehicle and quickly send an emergency call including an injury pattern to medical institutions and the like.

According to an embodiment of the present disclosure, a pedestrian detection system may include a detection module mounted on a front portion of a vehicle for detecting a collision with a pedestrian and an emergency call module for converting an electric signal received from the detection module into a detection value and determining an injury pattern based on the converted detection value.

The detection module may include a first detection unit mounted on a hood of the vehicle and a second detection unit mounted on a front beam of the vehicle.

The first detection unit may include a first crash sensor disposed on the hood and a first detection controller electrically connected to the first crash sensor. The first detection controller may be electrically connected to the emergency call module.

The hood may include an upper panel and a lower panel. The first crash sensor may be disposed between the upper panel and the lower panel.

The hood may include a detection region defined by the first crash sensor. The first detection controller may divide the detection region into a first detection region and a second detection region. The first detection region may be located closer to the front beam than the second detection region.

The emergency call module may be configured to determine an age range of the pedestrian by detecting whether a peak load is generated in any one of the first detection region and the second detection region when the pedestrian collides with the hood.

The first detection controller may be configured to vary an area of the first detection region and an area of the second detection region relative to each other as a speed of the vehicle is varied.

The second detection unit may include a second crash sensor disposed on the front beam of the vehicle and a second detection controller electrically connected to the second crash sensor. The second detection controller may be electrically connected to the emergency call module.

The emergency call module may be configured to determine an injury pattern based on a detection value obtained by the first detection unit and a detection value obtained by the second detection unit and transmit the injury pattern to a medical institution corresponding to the determined injury pattern.

The emergency call module may be configured to convert an electric signal received from the first detection unit into the detection value to thereby calculate a head injury detection value, compare the head injury detection value to a head injury reference value, and determine whether the pedestrian has a head injury.

The emergency call module may be configured to convert an electric signal received from the second detection unit into the detection value to thereby calculate a lower body injury detection value, compare the lower body injury detection value to a lower body injury reference value, and determine whether the pedestrian has a lower body injury.

The emergency call module may be configured to add the head injury detection value and the lower body injury detection value to thereby calculate a total injury detection value, compare the total injury detection value to a total injury reference value, and determine whether the pedestrian has an injury.

The emergency call module may be configured to compare the head injury detection value and the lower body injury detection value and determine an injury ratio between the head injury and the lower body injury.

BRIEF DESCRIPTION OF THE DRAWINGS

The above and other objects, features, and advantages of embodiments of the present disclosure will be more apparent

DETAILED DESCRIPTION OF ILLUSTRATIVE EMBODIMENTS

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with embodiments of the present disclosure will be omitted in order not to unnecessarily obscure the gist of embodiments of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art and are not to be interpreted as having ideal or excessively formal meanings unless clearly defined as having such in the present application.

Figure 1:
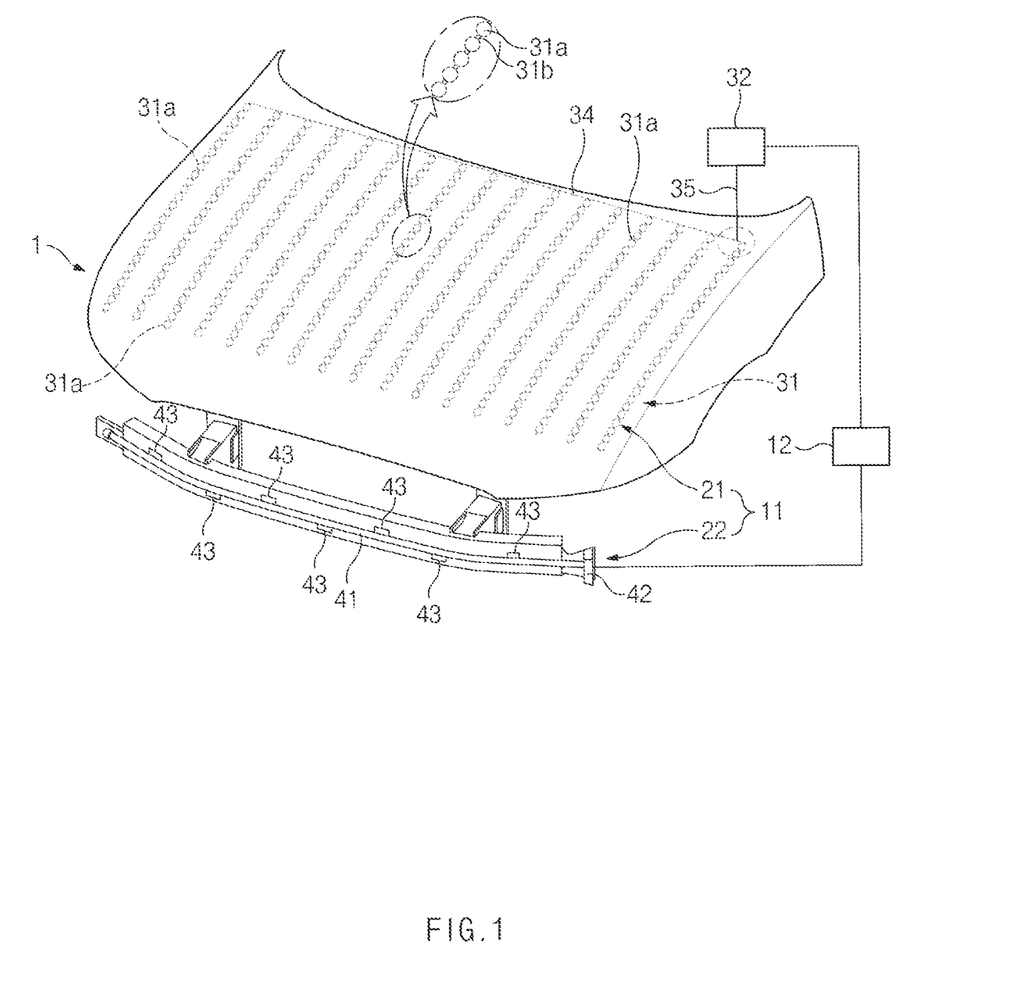
FIG. 1 illustrates a pedestrian detection system according to an exemplary embodiment of the present disclosure.
Figure 2:
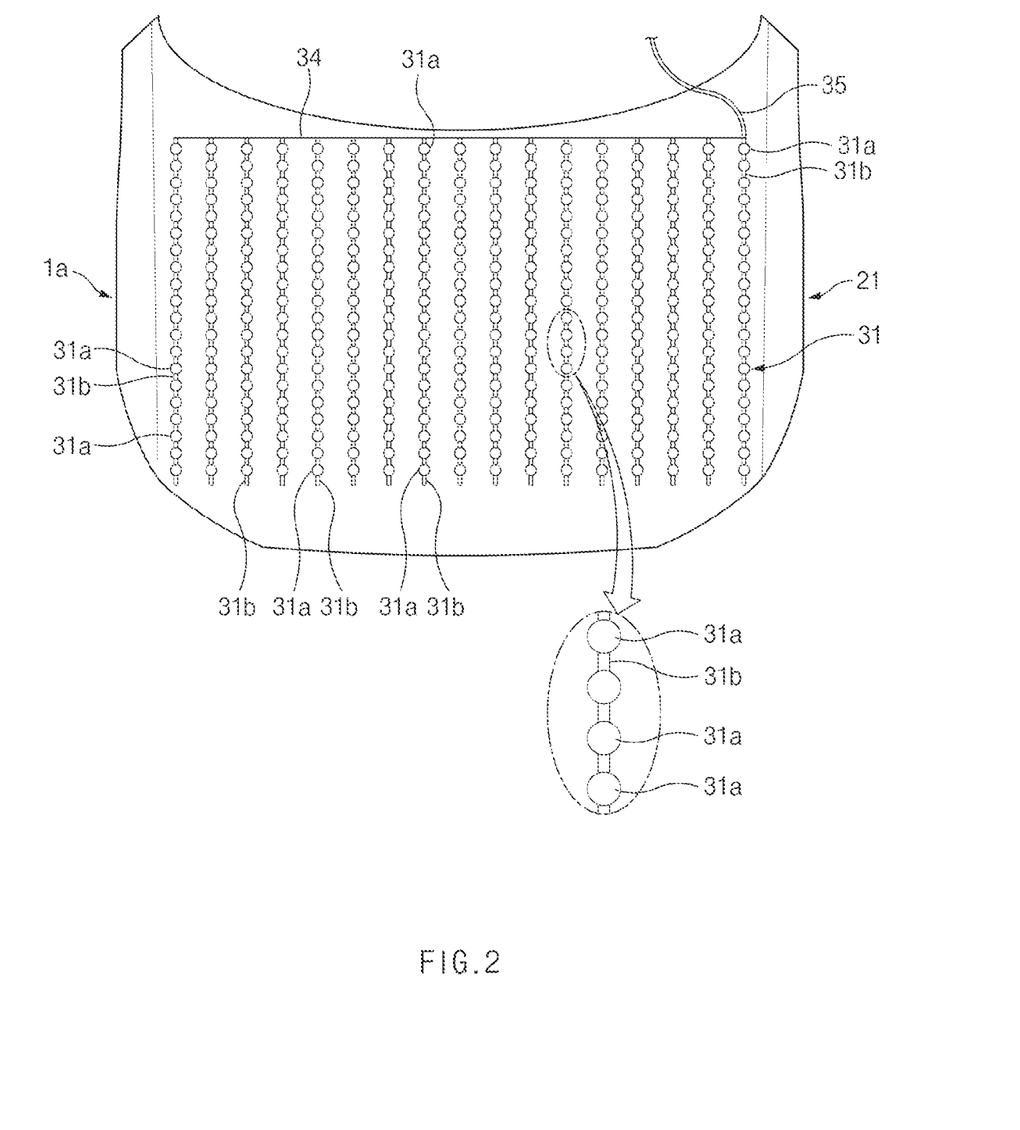
FIG. 2 illustrates a bottom view of a bottom surface of an upper panel of a hood in a pedestrian detection system according to an exemplary embodiment of the present disclosure.
Figure 3:
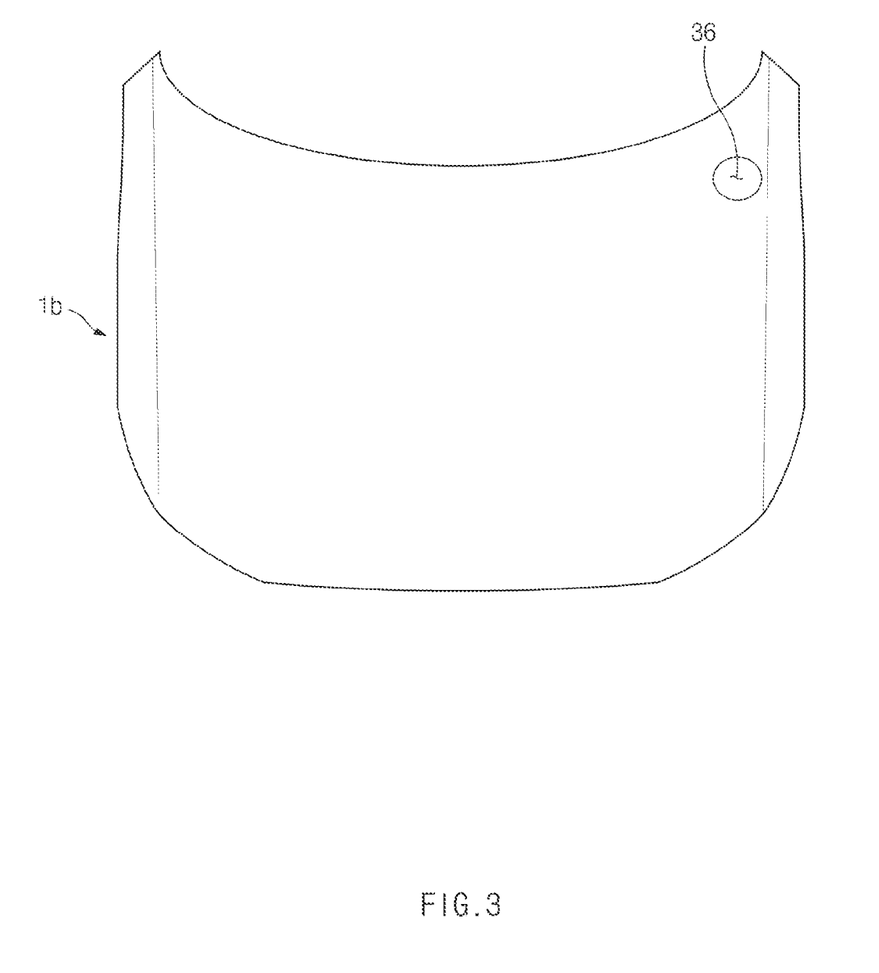
FIG. 3 illustrates a plan view of a top surface of a lower panel of a hood in a pedestrian detection system according to an exemplary embodiment of the present disclosure.
Figure 4:
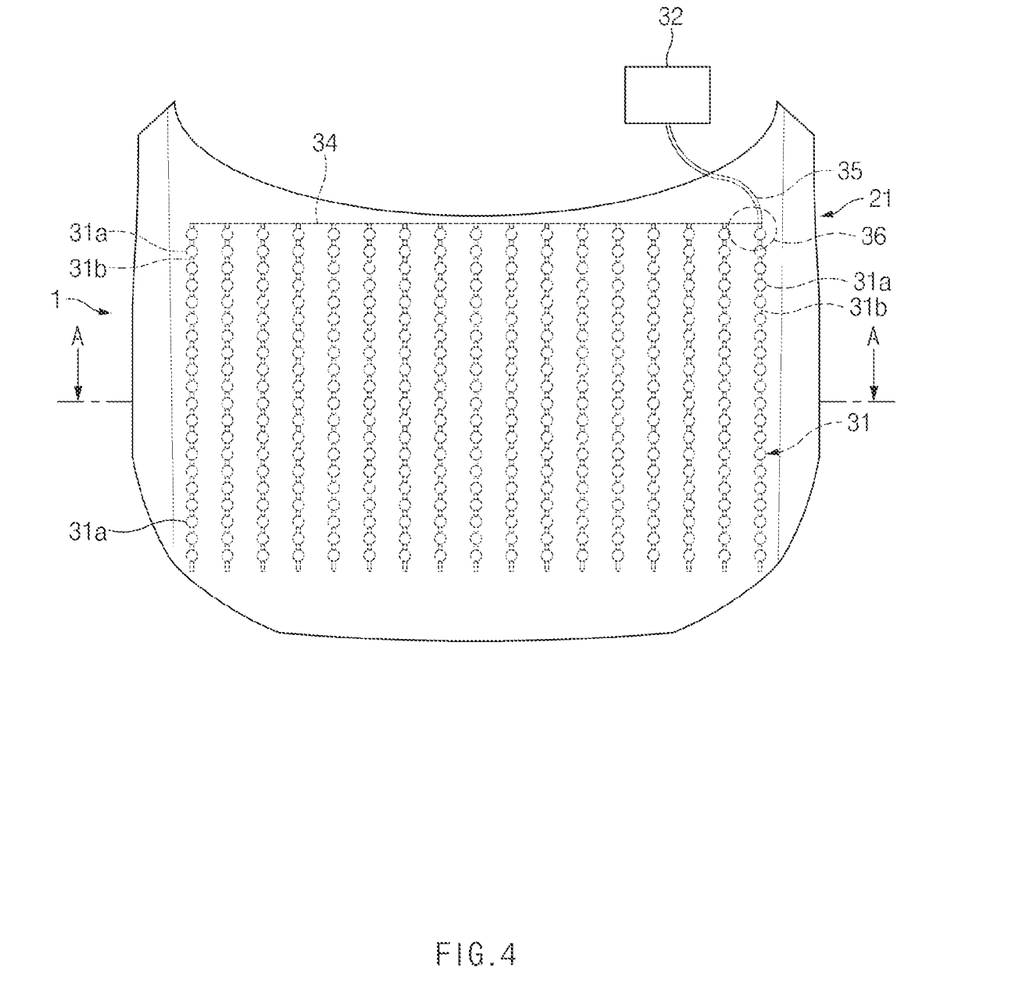
FIG. 4 illustrates a first detection unit of a pedestrian detection system according to an exemplary embodiment of the present disclosure.

Referring to FIGS. 1 and 3, a pedestrian detection system according to an exemplary embodiment of the present disclosure may include a detection module 11 detecting a collision with a pedestrian and an emergency call module 12 determining an injury pattern based on a detection value obtained by the detection module 11.

The detection module 11 may be mounted on a front portion of the vehicle and may be configured to accurately detect the pedestrian collision when the pedestrian collides with the front portion of the vehicle. The vehicle may include a hood 1 and a front beam 2 provided on the front portion thereof. The hood 1 may cover or uncover the top of a front compartment of the vehicle, and the front beam 2 may extend along a width direction of the vehicle on a front end of the vehicle.

The detection module 11 may include a first detection unit 21 mounted on the hood 1 of the vehicle and a second detection unit 22 mounted on the front beam 2 of the vehicle.

The first detection unit 21 may be mounted on the hood 1 of the vehicle so that the first detection unit 21 may detect a pedestrian's head injury when the pedestrian collides with the hood 1.

Referring to FIG. 1, the first detection unit 21 may include a first crash sensor 31 disposed on the hood 1 and a first detection controller 32 electrically connected to the first crash sensor 31.

The first crash sensor 31 may be disposed on an entirety or a partial region of the hood 1 and may be configured to accurately detect the collision position, collision degree, and the like of the pedestrian colliding with the hood 1. The first crash sensor 31 may include various sensors such as a linear pressure sensor, a matrix pressure sensor, an optical fiber sensor, and a sensor having a tube filled with a fluid.

According to an exemplary embodiment, the first crash sensor 31 may include a plurality of pressure sensing cells 31a equidistantly spaced apart from each other on the entirety or the partial region of the hood 1. The plurality of pressure sensing cells 31a may be spaced apart from each other equidistantly in the width direction of the vehicle and a longitudinal direction of the vehicle. The pressure sensing cells 31a may be any one of load cells, piezoelectric load cells, and strain gauges.

Referring to FIGS. 1 and 2, the plurality of pressure sensing cells 31a may be equidistantly attached to each linear electric conductor 31b, and the linear electric conductor 31b may extend along the longitudinal direction of the vehicle. The plurality of linear electric conductors 31b may be parallel to each other, and the plurality of linear electric conductors 31b may be arranged to be spaced apart from each other in the width direction of the vehicle so that the plurality of pressure sensing cells 31a may be arranged equidistantly on the entirety or the partial region of the hood 1. The plurality of linear electric conductors 31b may be electrically connected in parallel to a common wire 34, and a lead wire 35 may be connected to the common wire 34. Accordingly, the plurality of pressure sensing cells 31a may be electrically connected to the first detection controller 32 through the linear electric conductors 31b, the common wire 34, and the lead wire 35. The first detection controller 32 may be electrically connected to the emergency call module 12.

Figure 5:
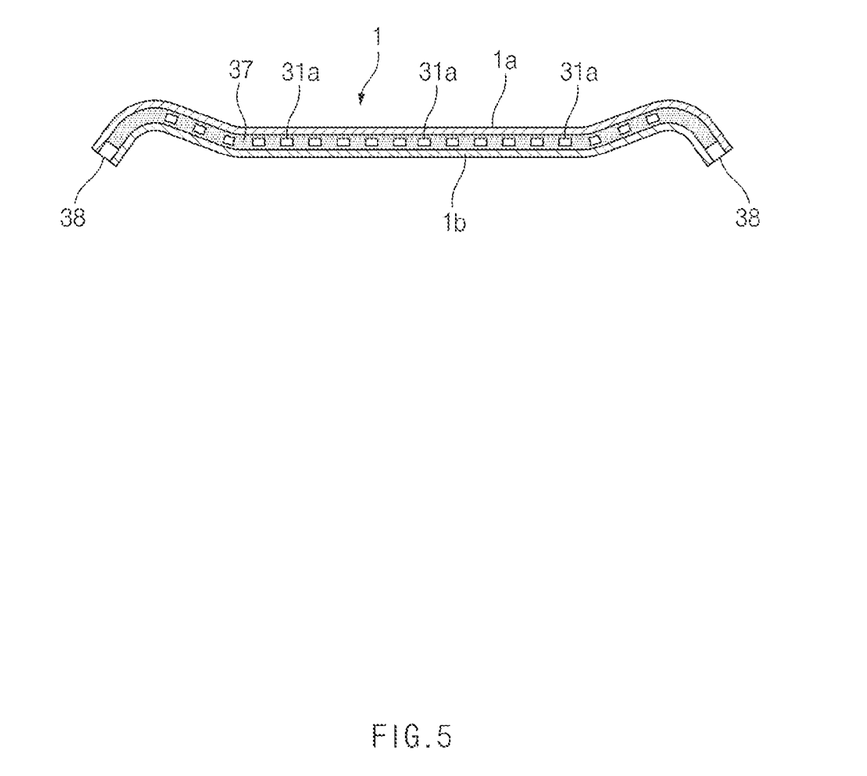
FIG. 5 illustrates a cross-sectional view, taken along line A-A of FIG. 4.

Referring to FIG. 5, the hood 1 may include an upper panel 1a and a lower panel 1b. The plurality of pressure sensing cells 31a may be equidistantly spaced apart from each other between the upper panel 1a and the lower panel 1b. Since the upper panel 1a is provided to achieve structural stiffness of the vehicle body, the upper panel 1a may have relatively high stiffness. Since the lower panel 1b is provided to increase attachment strength of the first crash sensor 31 and operational reliability of the first crash sensor 31, the lower panel 1b may have relatively low stiffness compared to the upper panel 1a.

FIG. 2 illustrates a bottom view of a bottom surface of the upper panel 1a. After the bottom surface of the upper panel 1a is sufficiently cleaned and dried, a liquid adhesive such as liquid epoxy may be applied to the bottom surface of the upper panel 1a. The first crash sensor 31 including the plurality of pressure sensing cells 31a, the plurality of linear electric conductors, and the common wire 34 may be attached to the applied liquid adhesive. Thereafter, removing air from the applied liquid adhesive, that is, de-airing may be performed. Then, a curing agent may be additionally applied to the liquid adhesive so that the liquid adhesive may be cured, and the cured liquid adhesive may form a support layer 37 (see FIG. 5).

FIG. 3 illustrates a plan view of a top surface of the lower panel 1b. The lower panel 1b may have a through hole 36 formed in one side thereof, and the lead wire 35 may be inserted into the through hole 36 through a grommet (not shown).

Referring to FIG. 5, the lower panel 1b may be attached to the upper panel 1a by pressing, heating, and the like. An edge sealing member 38 may be interposed between edges of the upper panel 1a and edges of the lower panel 1b so that the first crash sensor 31 may be firmly supported between the upper panel 1a and the lower panel 1b by the support layer 37.

Figure 6:
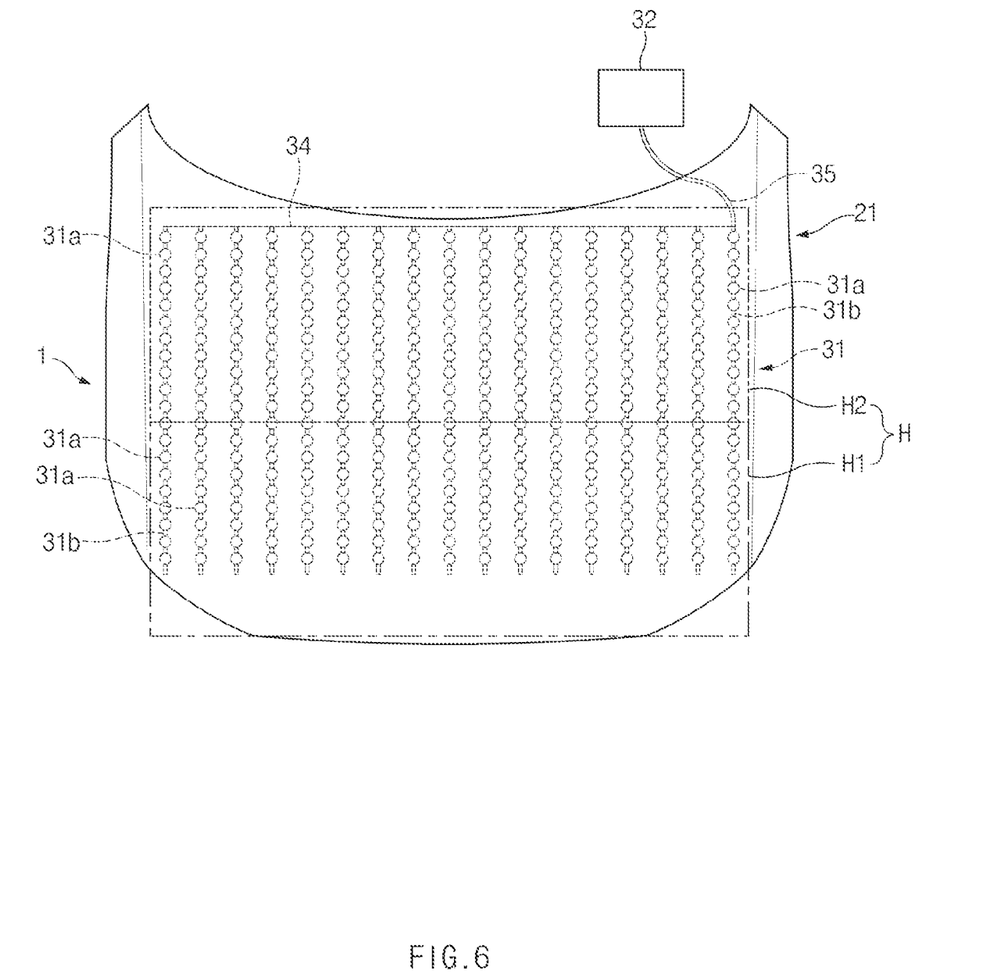
FIG. 6 illustrates a state in which a detection region of a hood is divided into a first detection region and a second detection region in a pedestrian detection system according to an exemplary embodiment of the present disclosure.

As the first crash sensor 31 is disposed on the entirety or the partial region of the hood 1, the entirety or the partial region of the hood 1 may serve as a detection region H in which the pedestrian collision is detected. Accordingly, the hood 1 may include the detection region H defined by the first crash sensor 31, and the first crash sensor 31 may accurately detect the pedestrian collision (the collision position, collision degree, and the like of the pedestrian) as the pedestrian collides with the detection region H of the hood 1. As the pedestrian collides with the part of the hood 1, an electric signal (for example, voltage) may be generated from at least some pressure sensing cells 31a of the first crash sensor 31, and the first detection controller 32 may transmit the generated electric signal to the emergency call module 12.

The first detection controller 32 may divide the detection region H into a first detection region H1 and a second detection region H2. The first detection region H1 may be located closer to the front beam 2 than the second detection region H2. Accordingly, the first detection region H1 may be used to detect a collision with a relatively short child, and the second detection region H2 may be used to detect a collision with an adult taller than a child. When the pedestrian collides with the hood 1, the emergency call module 12 may determine an age range of the pedestrian based on whether a peak load (impact load) is generated in any one of the first detection region H1 and the second detection region H2. Specifically, when the pedestrian collides with the hood 1, the first detection controller 32 may detect that the peak load is generated in the first detection region H1 of the hood 1, and accordingly the emergency call module 12 may determine that the child is injured. When the pedestrian collides with the hood 1, the first detection controller 32 may detect that the peak load is generated in the second detection region H2 of the hood 1, and accordingly the emergency call module 12 may determine that the adult is injured.

Figure 7:
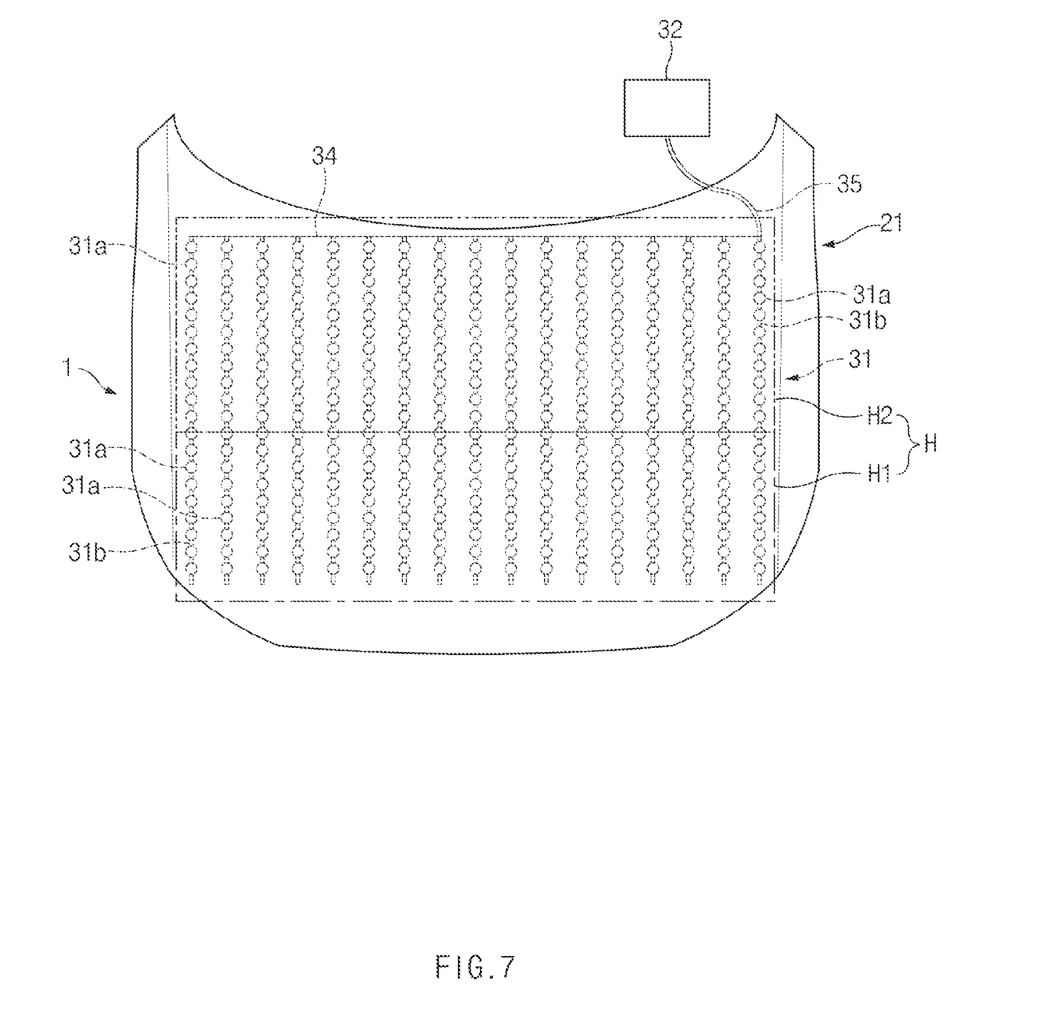
FIG. 7 illustrates a state in which an area of a first detection region becomes smaller than an area of a second detection region in a pedestrian detection system according to an exemplary embodiment of the present disclosure when a vehicle speed is relatively low.
Figure 8:
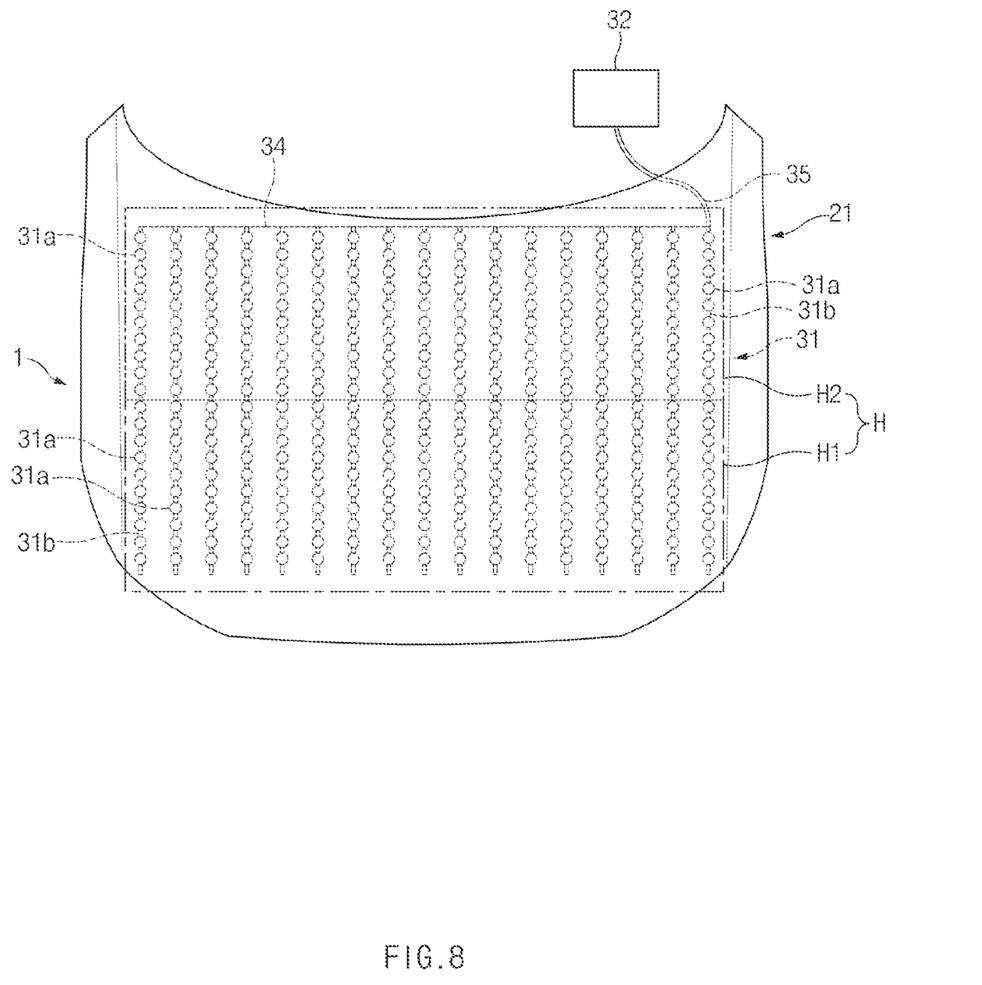
FIG. 8 illustrates a state in which an area of a first detection region is the same as or similar to an area of a second detection region in a pedestrian detection system according to an exemplary embodiment of the present disclosure when a vehicle speed is relatively medium.
Figure 9:
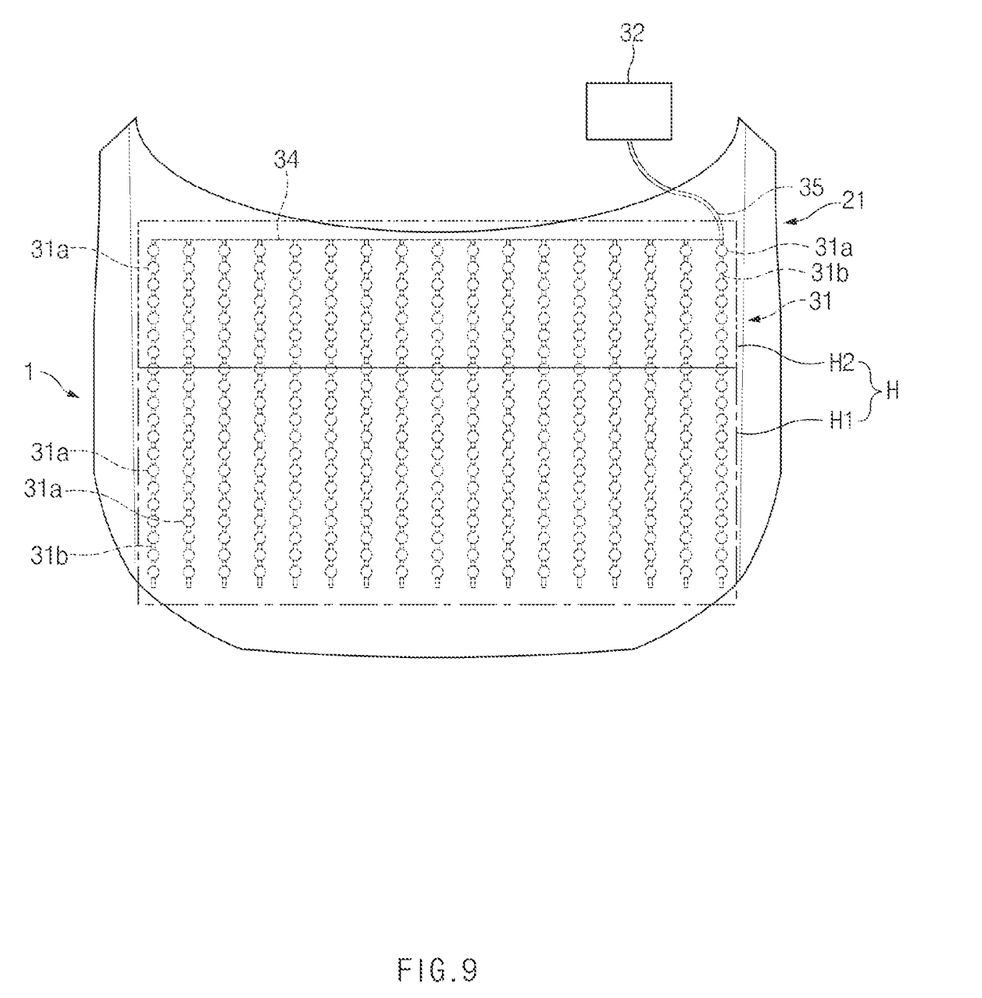
FIG. 9 illustrates a state in which an area of a first detection region becomes greater than an area of a second detection region in a pedestrian detection system according to an exemplary embodiment of the present disclosure when a vehicle speed is relatively high.

Referring to FIGS. 7 to 9, the first detection controller 32 may be configured to vary an area of the first detection region H1 and an area of the second detection region H2 relative to each other as the speed of the vehicle is varied. According to an exemplary embodiment, as the speed of the vehicle increases to a threshold speed (for example, 50 kph) or higher, the area of the first detection region H1 may become larger than the area of the second detection region H2.

Referring to FIG. 7, when the speed of the vehicle is relatively low (for example, 0-40 kph), the area of the first detection region H1 may become smaller than the area of the second detection region H2. When the speed of the vehicle is low, the occurrence of injuries to adults may be detected more accurately.

Referring to FIG. 8, when the speed of the vehicle is relatively medium (for example, 40-50 kph), the area of the first detection region H1 may become the same as or similar to the area of the second detection region H2.

Referring to FIG. 9, when the speed of the vehicle is relatively high (for example, 50-70 kph), the area of the first detection region H1 may become greater than the area of the second detection region H2. When the speed of the vehicle is high, the occurrence of injuries to children may be detected more accurately.

The above-described variations in the area of the first detection region H1 and the area of the second detection region H2 may be determined according to the layout of the vehicle and the manufacturer's know-how.

The second detection unit 22 may be mounted on the front beam 2 of the vehicle so that the second detection unit 22 may detect a pedestrian's lower body injury when the lower body of the pedestrian collides with the front beam 2.

Referring to FIG. 1, the second detection unit 22 may include a second crash sensor 41 disposed on the front beam 2 and a second detection controller 42 electrically connected to the second crash sensor 41.

The second crash sensor 41 may extend along a longitudinal direction of the front beam 2, and the second crash sensor 41 may be mounted on the front beam 2 through a plurality of brackets 43.

The second crash sensor 41 may be configured to accurately detect the collision position, collision degree, and the like of the pedestrian colliding with the front beam 2. The second crash sensor 41 may include various sensors such as a linear pressure sensor, a matrix pressure sensor, an optical fiber sensor, and a sensor having a tube filled with a fluid.

According to an exemplary embodiment, the second crash sensor 41 may be a linear pressure sensor extending along the longitudinal direction of the front beam 2. The second crash sensor 41 may include a plurality of pressure sensing cells (not shown) spaced apart from each other in the longitudinal direction of the front beam 2. The pressure sensing cells may be any one of load cells, piezoelectric load cells, and strain gauges. The plurality of pressure sensing cells may be equidistantly spaced apart from each other in the longitudinal direction of the front beam 2. A linear electric conductor (not shown) may extend along the longitudinal direction of the front beam 2, and the plurality of pressure sensing cells may be attached to the linear electric conductor. The plurality of pressure sensing cells of the second crash sensor 41 may be electrically connected to the second detection controller 42 through the linear electric conductor. The second detection controller 42 may be mounted on one end portion of the front beam 2. The second detection controller 42 may be electrically connected to the emergency call module 12.

As the pedestrian collides with the part of the front beam 2, an electric signal (for example, voltage) may be generated from at least some pressure sensing cells of the second crash sensor 41, and the second detection controller 42 may transmit the generated electric signal to the emergency call module 12.

The emergency call module 12 may be configured to convert the electric signal received from the detection module 11 into a physical detection value (a pressure value, a load value, and/or the like), determine an injury pattern based on the converted physical detection value, and transmit the injury pattern to an appropriate medical institution and/or emergency rescue center corresponding to the determined injury pattern. Specifically, the emergency call module 12 may be configured to determine the injury pattern based on the detection value obtained by the first detection unit 21 and the detection value obtained by the second detection unit 22. The injury pattern may include a head injury, a lower body injury, the degree of head injury, the degree of lower body injury, an injury ratio between the head injury and the lower body injury, a range of ages of victims (adults, children), and the like. The emergency call module 12 may transmit the determined injury pattern to the corresponding medical institution and the corresponding emergency rescue center.

The first detection controller 32 of the first detection unit 21 may transmit an electric signal (for example, voltage) generated from the first crash sensor 31 to the emergency call module 12, and the emergency call module 12 may convert the electric signal received from the first detection unit 21 into a physical detection value (a pressure value, a load value, or the like) to thereby calculate a head injury detection value Hi. The emergency call module 12 may compare the head injury detection value Hi to a head injury reference value Hic and determine whether the pedestrian has a head injury. Specifically, when the head injury detection value Hi is greater than or equal to the head injury reference value Hic (Hi≥Hic), the emergency call module 12 may determine that the pedestrian's head injury has occurred, and when the head injury detection value Hi is less than the head injury reference value Hic (Hi<Hic), the emergency call module 12 may determine that the pedestrian's head injury has not occurred. The head injury reference value Hic refers to a reference value for determining whether the head injury has occurred. According to an exemplary embodiment, the emergency call module 12 may divide the head injury detection value Hi by the head injury reference value Hic to thereby calculate a head injury determination value Hi/Hic. When the head injury determination value Hi/Hic is greater than or equal to 1 (Hi/Hic≥1), the emergency call module 12 may determine that the pedestrian's head injury has occurred, and when the head injury determination value Hi/Hic is less than 1 (Hi/Hic<1), the emergency call module 12 may determine that the pedestrian's head injury has not occurred.

The second detection controller 42 of the second detection unit 22 may transmit an electric signal (for example, voltage) generated from the second crash sensor 41 to the emergency call module 12, and the emergency call module 12 may convert the electric signal received from the second detection unit 22 into a physical detection value (a pressure value, a load value, or the like) to thereby calculate a lower body injury detection value Li. The emergency call module 12 may compare the lower body injury detection value Li to a lower body injury reference value Lic and determine whether the pedestrian has a lower body injury. Specifically, when the lower body injury detection value Li is greater than or equal to the lower body injury reference value Lic (Li≥Lic), the emergency call module 12 may determine that the pedestrian's lower body injury has occurred, and when the lower body injury detection value Li is less than the lower body injury reference value Lic (Li<Lic), the emergency call module 12 may determine that the pedestrian's lower body injury has not occurred. The lower body injury reference value Lic refers to a reference value for determining whether the lower body injury has occurred. According to an exemplary embodiment, the emergency call module 12 may divide the lower body injury detection value Li by the lower body injury reference value Lic to thereby calculate a lower body injury determination value Li/Lic. When the lower body injury determination value Li/Lic is greater than or equal to 1 (Li/Lic≥1), the emergency call module 12 may determine that the pedestrian's lower body injury has occurred, and when the lower body injury determination value Li/Lic is less than 1 (Li/Lic<1), the emergency call module 12 may determine that the pedestrian's lower body injury has not occurred.

The emergency call module 12 may add the head injury detection value Hi and the lower body injury detection value Li to thereby calculate a total injury detection value Hi+Li. The emergency call module 12 may compare the total injury detection value Hi+Li to a total injury reference value HLic and determine whether the pedestrian has an injury. The total injury reference value HLic refers to a reference value for determining whether the injury has occurred. Specifically, even though the pedestrian's lower body injury and/or the pedestrian's head injury has not occurred, when the total injury detection value Hi+Li is greater than or equal to the total injury reference value HLic ((Hi+Li)≥HLic), the emergency call module 12 may determine that the pedestrian's injury has occurred, and when the total injury detection value Hi+Li is less than the total injury reference value HLic ((Hi+Li)<HLic), the emergency call module 12 may determine that the pedestrian's injury has not occurred. According to an exemplary embodiment, the emergency call module 12 may divide the total injury detection value Hi+Li by the total injury reference value HLic to thereby calculate a total injury determination value (Hi+Li)/HLic. When the total injury determination value (Hi+Li)/HLic is greater than or equal to 1 ((Hi+Li)/HLic≥1), the emergency call module 12 may determine that the pedestrian's injury has occurred, and when the total injury determination value (Hi+Li)/HLic is less than 1 ((Hi+Li)/HLic<1), the emergency call module 12 may determine that the pedestrian's injury has not occurred.

The emergency call module 12 may compare the head injury detection value Hi and the lower body injury detection value Li and determine whether a ratio between the head injury and the lower body injury (hereinafter referred to as the "injury ratio") falls under any one of a head-centered injury, a lower body-centered injury, and a combined injury. According to an exemplary embodiment, the emergency call module 12 may divide the head injury detection value Hi by the lower body injury detection value Li to thereby calculate an injury ratio determination value Hi/Li. When the injury ratio determination value Hi/Li is greater than or equal to a first threshold value S1, the emergency call module 12 may determine the head-centered injury, which means that the head injury is greater than the lower body injury. When the injury ratio determination value Hi/Li is less than or equal to a second threshold value S2, the emergency call module 12 may determine the lower body-centered injury, which means that the lower body injury is greater than the head injury. When the injury ratio determination value Hi/Li is less than the first threshold value S1 and exceeds the second threshold value S2, the emergency call module 12 may determine the combined injury, which means that the head injury and the lower body injury are combined. The first threshold value S1 may be greater than 1, and the second threshold value S2 may be less than 1. The second threshold value S2 may be less than the first threshold value S1. For example, the first threshold value S1 may be 1.2, and the second threshold value S2 may be 0.8. When the injury ratio determination value Hi/Li is greater than or equal to 1.2, the emergency call module 12 may determine the head-centered injury. When the injury ratio determination value Hi/Li is less than or equal to 0.8, the emergency call module 12 may determine the lower body-centered injury. When the injury ratio determination value Hi/Li is less than 1.2 and exceeds 0.8, the emergency call module 12 may determine the combined injury.

As described above, the emergency call module 12 may determine various injury patterns including the head injury detection value Hi, the lower body injury detection value Li, the total injury detection value Hi+Li, the injury ratio between the head injury and the lower body injury, the degree of head injury, the degree of lower body injury, and the pedestrian's age range, and the emergency call module 12 may send an emergency call including the determined injury pattern to medical institutions and the like.

Table 1, Table 2, Table 3, and Table 4 below illustrate various injury patterns determined by the emergency call module 12.

Table 1 below illustrates an injury pattern of an adult pedestrian when the adult pedestrian collides with the vehicle.

TABLE 1

| Variables | Detection Value(s) | Determination |
|---|---|---|
| Hi/Hic | ≥1 | Head Injury Occurred |
| Li/Lic | ≥1 | Lower Body Injury Occurred |
| (Hi + Li)/HLic | ≥1 | Injury Occurred |
| Hi/Li | ≥S1 | Head-centered Injury |
| H1 | Not Detected | Not Child Pedestrian |
| H2 | Detected | Adult Pedestrian |

The injury pattern in Table 1 may be analyzed as follows: since the head injury determination value Hi/Hic is greater than or equal to 1, it may be determined that the pedestrian's head injury has occurred; since the lower body injury determination value Li/Lic is greater than or equal to 1, it may be determined that the pedestrian's lower body injury has occurred; since the total injury determination value (Hi+Li)/HLic is greater than or equal to 1, it may be determined that the pedestrian's injury has occurred; since the injury ratio determination value Hi/Li is greater than or equal to the first threshold value S1, it may be determined that the head-centered injury has occurred; and since the impact load (peak load) is not detected in the first detection region H1 of the hood 1 but is detected in the second detection region H2 of the hood 1, it may be determined that the adult pedestrian is injured. Accordingly, the emergency call module 12 may determine that the adult pedestrian's head-centered injury has occurred and send an emergency call including the injury pattern illustrated in Table 1 to a corresponding medical institution specialized in neurosurgery and a corresponding emergency rescue center.

Table 2 below illustrates an injury pattern of a child pedestrian when the child pedestrian collides with the vehicle.

TABLE 2

| Variables | Detection Value(s) | Determination |
|---|---|---|
| Hi/Hic | ≥1 | Head Injury Occurred |
| Li/Lic | ≥1 | Lower Body Injury Occurred |
| (Hi + Li)/HLic | ≥1 | Injury Occurred |
| Hi/Li | ≥S1 | Head-centered Injury |
| H1 | Detected | Child Pedestrian |
| H2 | Not Detected | Not Adult Pedestrian |

The injury pattern in Table 2 may be analyzed as follows: since the head injury determination value Hi/Hic is greater than or equal to 1, it may be determined that the pedestrian's head injury has occurred; since the lower body injury determination value Li/Lic is greater than or equal to 1, it may be determined that the pedestrian's lower body injury has occurred; since the total injury determination value (Hi+Li)/HLic is greater than or equal to 1, it may be determined that the pedestrian's injury has occurred; since the injury ratio determination value Hi/Li is greater than or equal to the first threshold value S1, it may be determined that the head-centered injury has occurred; and since the impact load (peak load) is detected in the first detection region H1 of the hood 1 not in the second detection region H2 of the hood 1, it may be determined that the child pedestrian is injured. Accordingly, the emergency call module 12 may determine that the child pedestrian's head-centered injury has occurred and send an emergency call including the injury pattern illustrated in Table 2 to a corresponding medical institution specialized in pediatric neurosurgery and a corresponding emergency rescue center.

Table 3 below illustrates an injury pattern of an adult pedestrian when the adult pedestrian collides with the vehicle.

TABLE 3

| Variables | Detection Value(s) | Determination |
|---|---|---|
| Hi/Hic | <1 | Head Injury Not Occurred |
| Li/Lic | ≥1 | Lower Body Injury Occurred |
| (Hi + Li)/HLic | ≥1 | Injury Occurred |
| Hi/Li | ≤S2 | Lower Body-centered Injury |
| H1 | Not Detected | Not Child Pedestrian |
| H2 | Detected | Adult Pedestrian |

The injury pattern in Table 3 may be analyzed as follows: since the head injury determination value Hi/Hic is less than 1, it may be determined that the pedestrian's head injury has not occurred; since the lower body injury determination value Li/Lic is greater than or equal to 1, it may be determined that the pedestrian's lower body injury has occurred; since the total injury determination value (Hi+Li)/HLic is greater than or equal to 1, it may be determined that the pedestrian's injury has occurred; since the injury ratio determination value Hi/Li is less than or equal to the second threshold value S2, it may be determined that the lower body-centered injury has occurred; and since the impact load (peak load) is not detected in the first detection region H1 of the hood 1 but is detected in the second detection region H2 of the hood 1, it may be determined that the adult pedestrian is injured. Accordingly, the emergency call module 12 may determine that the adult pedestrian's lower body-centered injury has occurred and send an emergency call including the injury pattern illustrated in Table 3 to a corresponding medical institution specialized in orthopedics and a corresponding emergency rescue center.

Table 4 below illustrates an injury pattern of a child pedestrian when the child pedestrian collides with the vehicle.

TABLE 4

| Variables | Detection Value(s) | Determination |
|---|---|---|
| Hi/Hic | <1 | Head Injury Not Occurred |
| Li/Lic | <1 | Lower Body Injury Not Occurred |
| (Hi + Li)/HLic | ≥1 | Injury Occurred |
| Hi/Li | S2 < Hi/Li < S1 | Combined Injury |
| H1 | Detected | Child Pedestrian |
| H2 | Not Detected | Not Adult Pedestrian |

The injury pattern in Table 4 may be analyzed as follows: since the head injury determination value Hi/Hic is less than 1, it may be determined that the pedestrian's head injury has not occurred; since the lower body injury determination value Li/Lic is less than 1, it may be determined that the pedestrian's lower body injury has not occurred; since the total injury determination value (Hi+Li)/HLic is greater than or equal to 1, it may be determined that the pedestrian's injury has occurred; since the injury ratio determination value Hi/Li is less than the first threshold value S1 and exceeds the second threshold value S2, it may be determined that the combined injury has occurred; and since the impact load (peak load) is detected in the first detection region H1 of the hood 1 not in the second detection region H2 of the hood 1, it may be determined that the child pedestrian is injured. Accordingly, the emergency call module 12 may determine that the child pedestrian's combined injury has occurred and send an emergency call including the injury pattern illustrated in Table 4 to a corresponding medical institution specialized in orthopedics and a corresponding emergency rescue center.

According to the above-described exemplary embodiments of the present disclosure, when the pedestrian collides with the vehicle, the emergency call module 12 may accurately determine the injury pattern of the pedestrian through the detection module 11 and quickly send the emergency call including the determined injury pattern to the appropriate medical institution so that the victim may be transported to the medical institution very quickly.

As set forth above, the pedestrian detection system according to exemplary embodiments of the present disclosure may be designed to accurately detect the pedestrian injuries and determine the injury pattern of the pedestrian using the detection module when the pedestrian collides with the vehicle and quickly send the emergency call to the appropriate medical institution corresponding to the determined injury pattern, thereby allowing the victim to be transported to the appropriate medical institution very quickly.

Hereinabove, although embodiments of the present disclosure have been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A pedestrian detection system comprising:
a detection device mounted on a front portion of a vehicle and configured to detect a collision with a pedestrian; and
an emergency call device configured to convert an electric signal received from the detection device into a detection value and determine an injury pattern based on the detection value;
wherein the detection device comprises a first detector mounted on a hood of the vehicle;
wherein the first detector comprises a first crash sensor disposed on the hood; and
wherein the first crash sensor includes a plurality of pressure sensing cells equidistantly spaced apart from each other on at least a partial region of the hood.

2. The pedestrian detection system according to claim 1, wherein the detection device further comprises a second detector mounted on a front beam of the vehicle.

3. The pedestrian detection system according to claim 1, wherein:
the first detector further comprises a first detection controller electrically connected to the first crash sensor; and
the first detection controller is electrically connected to the emergency call device.

4. The pedestrian detection system according to claim 3, wherein:
the hood comprises an upper panel and a lower panel; and
the first crash sensor is disposed between the upper panel and the lower panel.

5. The pedestrian detection system according to claim 3, wherein:
the hood comprises a detection region defined by the first crash sensor;
the detection region is divided into a first detection region and a second detection region by the first detection controller; and
the first detection region is located closer to a front beam than the second detection region.

6. The pedestrian detection system according to claim 5, wherein the emergency call device is configured to determine an age range of the pedestrian by detecting whether a peak load is generated in the first detection region or the second detection region in response to the pedestrian colliding with the hood.

7. The pedestrian detection system according to claim 5, wherein the first detection controller is configured to vary an area of the first detection region and an area of the second detection region relative to each other as a speed of the vehicle is varied.

8. The pedestrian detection system according to claim 2, wherein:
the second detector comprises a second crash sensor disposed on the front beam of the vehicle and a second detection controller electrically connected to the second crash sensor; and
the second detection controller is electrically connected to the emergency call device.

9. A pedestrian detection system comprising:
a first detector mounted on a hood of a vehicle and configured to detect a collision with a pedestrian;
a second detector mounted on a front beam of the vehicle and configured to detect the collision with the pedestrian; and
an emergency call device configured to:
convert electric signals received from the first detector and the second detector into a first detection value and a second detection value;
determine an injury pattern based on the first detection value and the second detection value; and transmit the injury pattern to a medical institution corresponding to the injury pattern;

wherein the first detector comprises a first crash sensor disposed on the hood, and wherein the first crash sensor includes a plurality of pressure sensing cells equidistantly spaced apart from each other on at least a partial region of the hood.

10. The pedestrian detection system according to claim 9, wherein the emergency call device is configured to convert a first electric signal received from the first detector into the first detection value to thereby calculate a head injury detection value, compare the head injury detection value to a head injury reference value, and determine whether the pedestrian has a head injury.

11. The pedestrian detection system according to claim 10, wherein the emergency call device is configured to convert a second electric signal received from the second detector into the second detection value to thereby calculate a lower body injury detection value, compare the lower body injury detection value to a lower body injury reference value, and determine whether the pedestrian has a lower body injury.

12. The pedestrian detection system according to claim 11, wherein the emergency call device is configured to add the head injury detection value and the lower body injury detection value to thereby calculate a total injury detection value, compare the total injury detection value to a total injury reference value, and determine whether the pedestrian has an injury.

13. The pedestrian detection system according to claim 11, wherein the emergency call device is configured to compare the head injury detection value and the lower body injury detection value and determine an injury ratio between the head injury and the lower body injury.

14. A vehicle comprising:
a vehicle body comprising a hood and a front beam;
a first detector mounted on the hood and configured to detect a collision with a pedestrian;
a second detector mounted on the front beam and configured to detect the collision with the pedestrian; and
an emergency call device configured to convert a first electric signal received from the first detector into a first detection value, convert a second electric signal received from the second detector into a second detection value, and determine an injury pattern based on the first detection value and the second detection value;

wherein the first detector comprises a first crash sensor disposed on the hood; and wherein the first crash sensor includes a plurality of pressure sensing cells equidistantly spaced apart from each other on at least a partial region of the hood.

15. The vehicle according to claim 14, wherein:
the first detector further comprises a first detection controller electrically connected to the first crash sensor; and
the first detection controller is electrically connected to the emergency call device.

16. The vehicle according to claim 14, wherein:
the hood comprises an upper panel and a lower panel; and
the first crash sensor is disposed between the upper panel and the lower panel.

17. The vehicle according to claim 15, wherein:
the hood comprises a detection region defined by the first crash sensor;
the detection region is divided into a first detection region and a second detection region by the first detection controller; and
the first detection region is located closer to the front beam than the second detection region.

18. The vehicle according to claim 17, wherein the emergency call device is configured to determine an age range of the pedestrian by detecting whether a peak load is generated in the first detection region or the second detection region in response to the pedestrian colliding with the hood.

19. The vehicle according to claim 17, wherein the first detection controller is configured to vary an area of the first detection region and an area of the second detection region relative to each other as a speed of the vehicle is varied.

20. The vehicle according to claim 14, wherein:
the second detector comprises a second crash sensor disposed on the front beam of the vehicle and a second detection controller electrically connected to the second crash sensor; and
the second detection controller is electrically connected to the emergency call device.

* * * * *